United States Patent
Lin

(10) Patent No.: US 10,151,891 B1
(45) Date of Patent: Dec. 11, 2018

(54) OPTICAL TRANSCEIVER

(71) Applicant: Prime World International Holdings Ltd., New Taipei (TW)

(72) Inventor: Huan-Yu Lin, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 0 days.

(21) Appl. No.: 15/791,987

(22) Filed: Oct. 24, 2017

(51) Int. Cl.
  *G02B 6/42* (2006.01)
  *G02B 6/34* (2006.01)
  *H04B 10/40* (2013.01)

(52) U.S. Cl.
  CPC ............. *G02B 6/4204* (2013.01); *G02B 6/34* (2013.01); *G02B 6/4214* (2013.01); *H04B 10/40* (2013.01)

(58) Field of Classification Search
  CPC ....... G02B 6/4214; G02B 6/34; G02B 6/4231
  USPC ...... 385/31, 36, 47, 88, 89, 92, 93; 398/135, 398/139
  See application file for complete search history.

(56) References Cited

U.S. PATENT DOCUMENTS

| | | | |
|---|---|---|---|
| 5,117,476 A | 5/1992 | Yingst et al. | |
| 6,623,173 B1 | 9/2003 | Grois et al. | |
| 6,945,712 B1 | 9/2005 | Conn | |
| 7,108,432 B2 * | 9/2006 | Nagasaka | G02B 6/32 385/129 |
| 7,419,312 B2 * | 9/2008 | Nagasaka | G02B 6/4204 385/88 |
| 8,676,006 B2 * | 3/2014 | Morioka | G02B 6/4214 385/14 |
| 8,787,714 B2 * | 7/2014 | Morioka | G02B 6/4214 385/15 |
| 8,939,657 B2 * | 1/2015 | Hung | G02B 6/42 385/89 |
| 9,035,234 B2 * | 5/2015 | Wu | H01L 31/12 250/239 |
| 9,063,281 B2 * | 6/2015 | Lin | G02B 6/4286 |
| 9,134,487 B2 * | 9/2015 | Chang | G02B 6/4204 |
| 9,377,594 B2 * | 6/2016 | Liff | G02B 6/4214 |

(Continued)

OTHER PUBLICATIONS

U.S. Office Action dated Jun. 29, 2018, received in related U.S. Appl. No. 15/724,621, 14 pp.

(Continued)

*Primary Examiner* — Robert Tavlykaev
(74) *Attorney, Agent, or Firm* — Grossman Tucker Perreault & Pfleger, PLLC

(57) ABSTRACT

An optical transceiver includes a substrate, a transceiver module, an optical lens and a ferrule. The transceiver module is disposed on an outer surface of the substrate. The optical lens includes a supporting portion and at least one extension portion connected to the supporting portion. The extension portion is located between the supporting portion and the substrate. The supporting portion defines a bottom surface facing the outer surface. The bottom surface is spaced apart from the outer surface. The extension portion defines a lateral surface connected to the bottom surface. The bottom surface of the supporting portion, the lateral surface of the at least one extension portion and the outer surface of the substrate jointly form an accommodation groove. The ferrule is disposed in the accommodation groove through an opening of the accommodation groove, and the ferrule is supported by the supporting portion.

9 Claims, 6 Drawing Sheets

(56) References Cited

U.S. PATENT DOCUMENTS

| | | | |
|---|---|---|---|
| 2004/0202477 A1* | 10/2004 | Nagasaka | G02B 6/4214 398/138 |
| 2005/0238294 A1* | 10/2005 | Nagasaka | G02B 6/4214 385/88 |
| 2006/0164738 A1* | 7/2006 | Yamamoto | G02B 6/3829 359/871 |
| 2011/0293221 A1 | 12/2011 | Kaneshiro et al. | |
| 2013/0266260 A1 | 10/2013 | Morioka et al. | |
| 2014/0064662 A1 | 3/2014 | Ootorii | |
| 2014/0185995 A1 | 7/2014 | Lee et al. | |
| 2017/0090125 A1* | 3/2017 | Kurashima | G02B 6/327 |
| 2017/0219786 A1 | 8/2017 | Morioka | |

OTHER PUBLICATIONS

U.S. Office Action dated Jan. 12, 2018, received in related U.S. Appl. No. 15/722,279, 9 pgs.

\* cited by examiner

OPTICAL TRANSCEIVER

TECHNICAL FIELD

The present disclosure relates to an optical transceiver, more particularly to an optical transceiver including an optical lens.

BACKGROUND

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different specifications have been provided such as XFP (10 Gigabit Small Form Factor Pluggable) used in 10 GB/s communication rate and QSFP (Quad Small Form-factor Pluggable).

In the optical transceiver, an optical lens is configured for guiding light to active components such as photodiodes. Furthermore, a fiber connector, such as MT-type ferrule connector, is used to retain multiple optical fibers in a fixed position within a fiber passageway, and the fiber connector is always held by its respective housing.

SUMMARY

According to one aspect of the present disclosure, an optical transceiver includes a substrate, a transceiver module, an optical lens and a ferrule. The transceiver module is disposed on an outer surface of the substrate. The optical lens includes a supporting portion and at least one extension portion connected to the supporting portion. The one extension portion is located between the supporting portion and the substrate, and a side of the extension portion opposite to the supporting portion is disposed on the outer surface of the substrate. The supporting portion covers the transceiver module. A bottom surface of the supporting portion faces the outer surface, and the bottom surface is spaced apart from the outer surface. A lateral surface of the extension portion is connected to the bottom surface. The bottom surface of the supporting portion, the lateral surface of the extension portion and the outer surface of the substrate jointly defines an accommodation groove. The ferrule is disposed in the accommodation groove through an opening of the accommodation groove, and the ferrule is supported by the supporting portion.

According to another aspect of the present disclosure, an optical transceiver includes a substrate and an optical lens. The optical lens includes a supporting portion and at least one extension portion connected to the supporting portion. The extension portion is located between the supporting portion and the substrate. A side of the extension portion opposite to the supporting portion is disposed on the outer surface. A bottom surface of the supporting portion faces the outer surface, and the bottom surface is spaced apart from the outer surface. A lateral surface of the extension portion is connected to the bottom surface. The bottom surface of the supporting portion, the lateral surface of the extension portion and the outer surface of the substrate jointly define an accommodation groove allowing for placement of ferrule.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
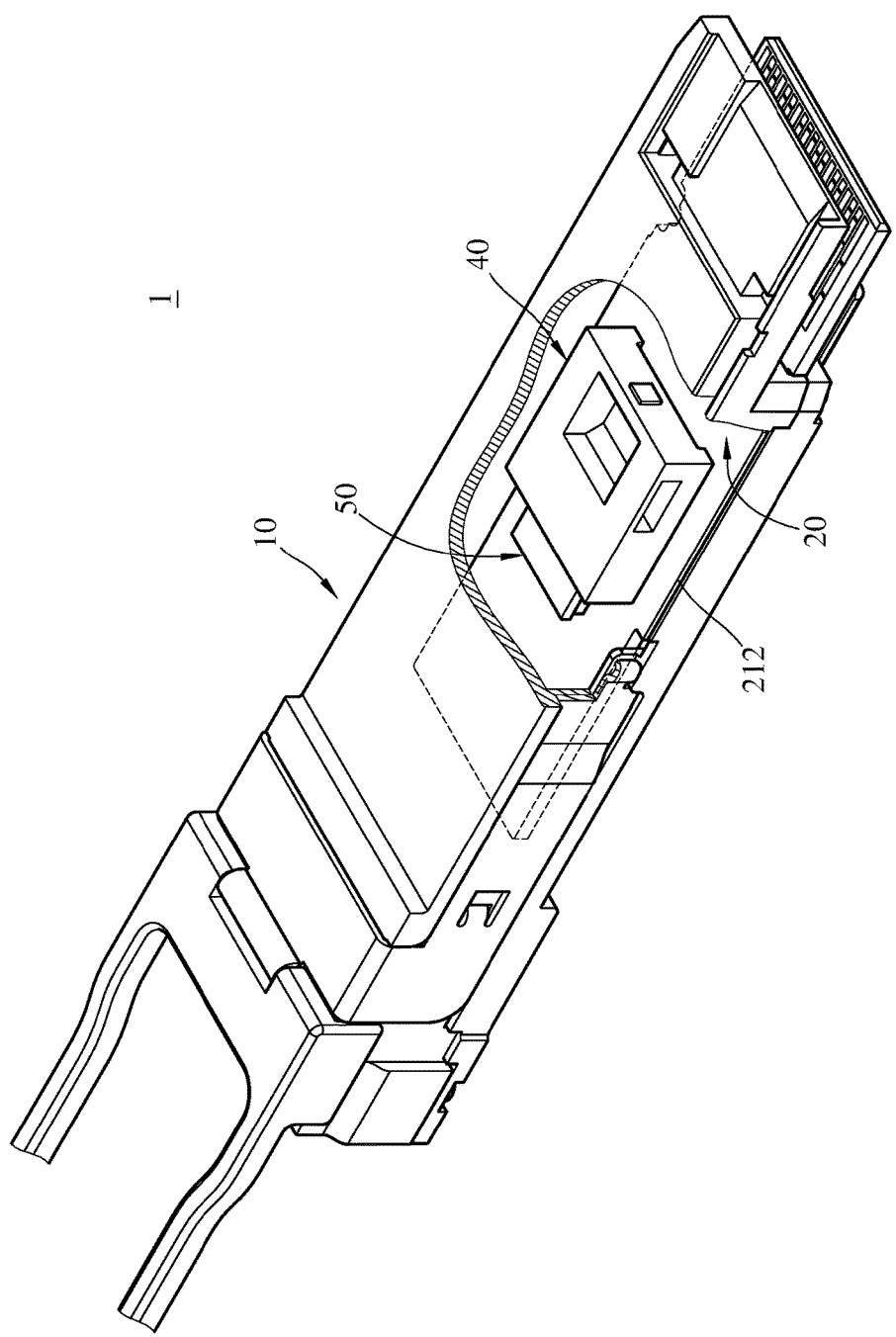
FIG. 1 is a perspective view of an optical transceiver according to one embodiment of the present disclosure.
Figure 2:
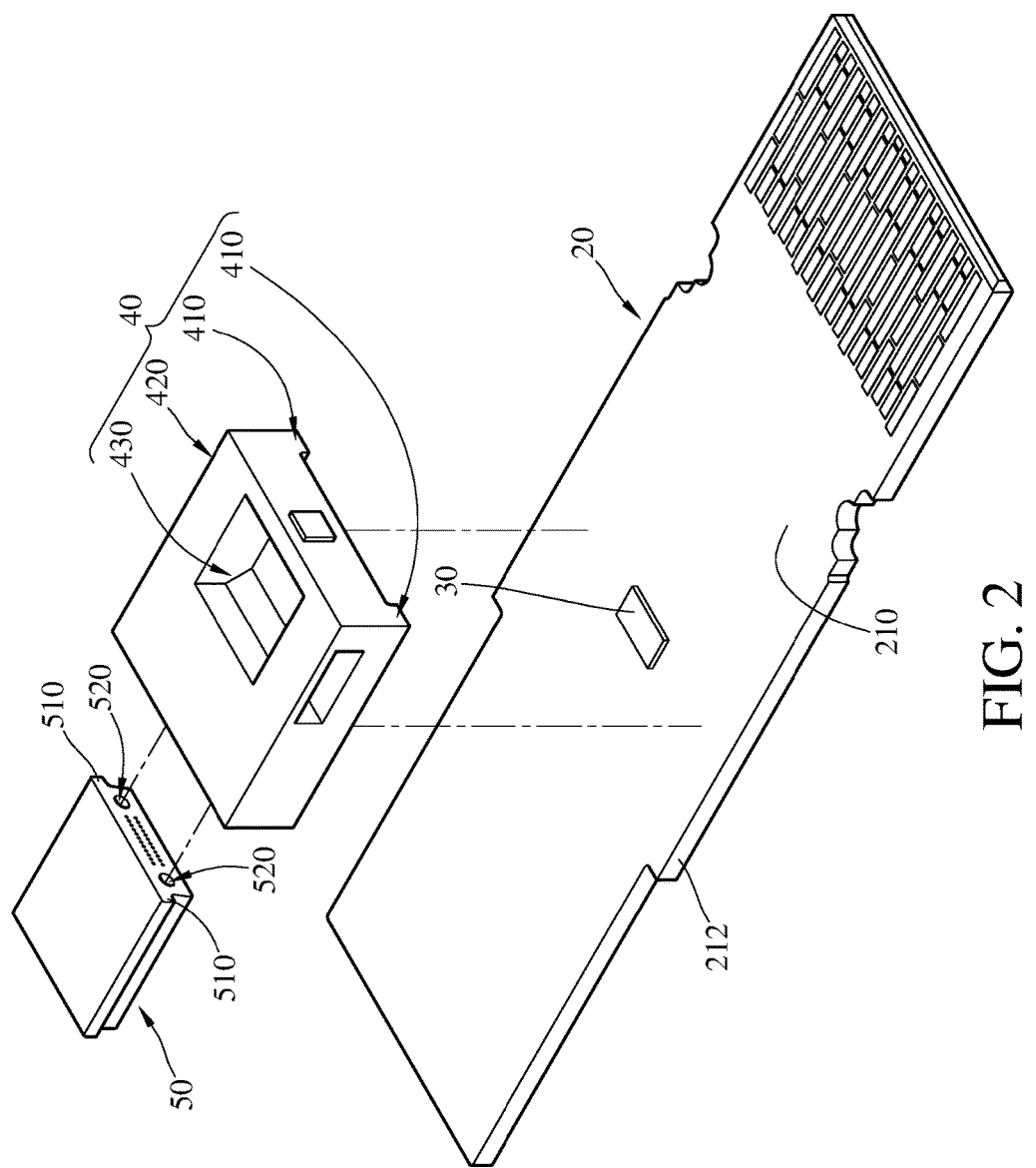
FIG. 2 is an exploded view of the optical transceiver in FIG. 1.
Figure 3:
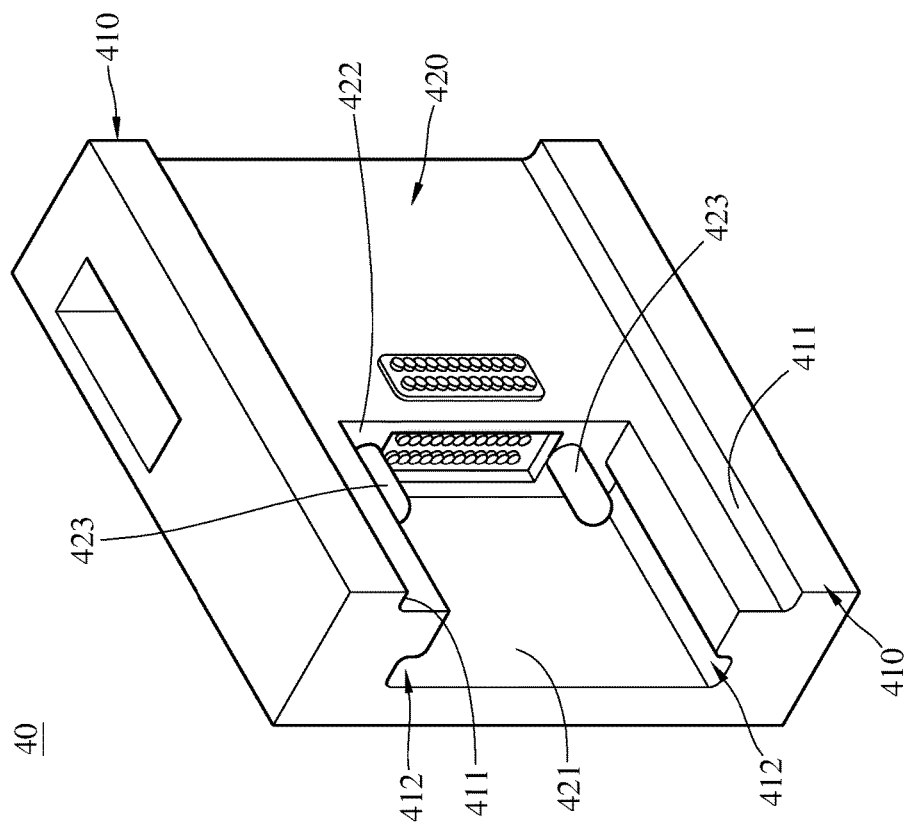
FIG. 3 is a perspective view of an optical lens in FIG. 2.
Figure 4:
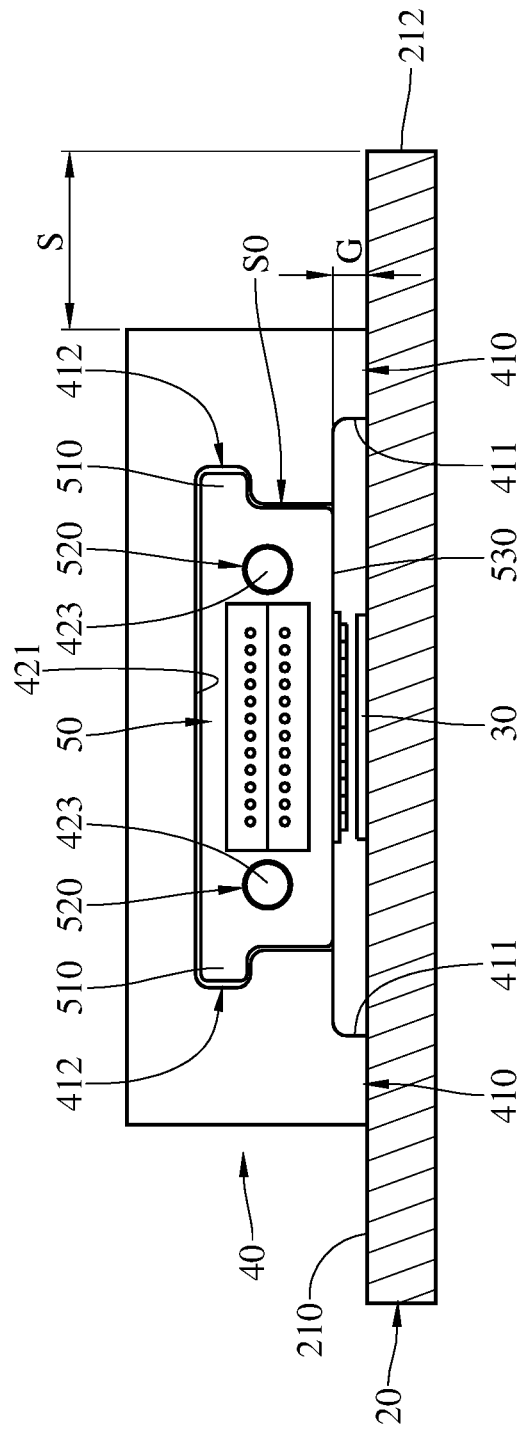
FIG. 4 is a side view of the optical transceiver in FIG. 1.
Figure 5:
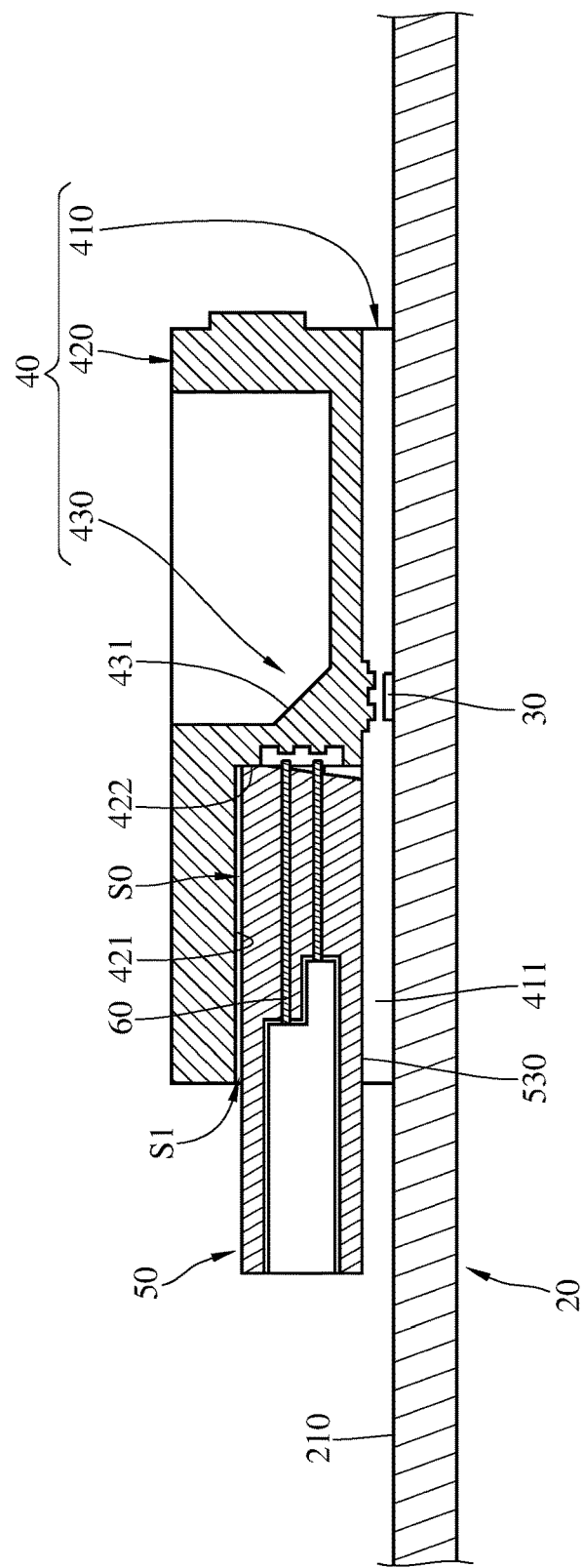
FIG. 5 is a cross-sectional view of the optical transceiver in FIG. 1 with inserted optical fibers.

Please refer to FIG. 1 to FIG. 5. FIG. 1 is a perspective view of an optical transceiver according to one embodiment of the present disclosure. FIG. 2 is an exploded view of the optical transceiver in FIG. 1. FIG. 3 is a perspective view of an optical lens in FIG. 2. FIG. 4 is a side view of the optical transceiver in FIG. 1. FIG. 5 is a cross-sectional view of the optical transceiver in FIG. 1 with inserted optical fibers. In this embodiment, an optical transceiver 1 is disclosed, and the optical transceiver 1 includes a case 10, a substrate 20, a transceiver module 30, an optical lens 40 and a ferrule 50.

The case 10, for example, is made of metal. The substrate 20, for example, is a circuit board or a package substrate disposed in the case 10. For the purpose of illustration, the case 10 is omitted from FIG. 1 through FIG. 5.

The transceiver module 30 is disposed on an outer surface 210 of the substrate 20. In this embodiment, the transceiver module 30 includes multiple electronic components and multiple active components which are physically separated from each other. Each electronic component, for example, could be an IC (integrated circuit) chip. For a pair of two electronic components, one of the two electronic components is a driver IC chip, and another electronic component is an amplifier IC chip. It is worth nothing that the number of the electronic components in the present disclosure is not limited by the above. Each active component, for example, could be a laser diode, a light emitting diode, a P-I-N photodiode or an avalanche photodiode. For a pair of two active components, one of the two active components is a laser diode coupled to the driver IC chip, and another active component is a P-I-N photodiode coupled to the amplifier IC chip. As with the number of the electronic components, the number of the active components is not limited in view of this paragraph.

The optical lens 40 is disposed on the outer surface 210 for guiding light to the transceiver module 30. In detail, the optical lens 40 includes two extension portions 410, a supporting portion 420 and a reflecting portion 430. The two extension portions 410 are disposed on the outer surface 210 of the substrate 20. Each extension portion 410 defines a lateral surface 411, and the two lateral surfaces 411 face each other. In this embodiment, each lateral surface 411 is a curved surface which defines a concave shape and a convex shape, and the transceiver module 30 are located between the two lateral surfaces 411. It is worth nothing that the present disclosure is not limited to the number of the extension portions 410.

The supporting portion 420 is connected to the two extension portions 410, and the two extension portions 410 are located between the supporting portion 420 and the substrate 20. Two opposite sides of each extension portion 410 are disposed on the supporting portion 420 and the substrate 20, respectively. The supporting portion 420 defines a bottom surface 421 facing the outer surface 210 of the substrate 20. The lateral surfaces 411 of the extension portions 410 are connected to the bottom surface 421, and the bottom surface 421 is spaced apart from the outer surface 210. In this embodiment, the optical lens 40 is disposed on the outer surface 210 so that the supporting portion 420 covers the active components and the electronic components of the transceiver module 30, but the present disclosure is not limited thereto. In some other embodiments, the supporting portion 420 covers either the electronic components or the active components.

The reflecting portion 430 is disposed on the supporting portion 420. One or more kinds of materials with high reflectivity, such as silver or gold, are coated on an inclined reflecting surface 431 of the reflecting portion 430. The bottom surface 421 of the supporting portion 420, the lateral surfaces 411 of the two extension portions 410 and the outer surface 210 of the substrate 20 jointly form an accommodation groove S0 that is surrounded by the substrate 20 and the optical lens 40. One end of the accommodation groove S0 is adjacent to the reflecting surface 431 of the reflecting portion 430, and there is an opening S1 on the opposite end of the accommodation groove S0.

The ferrule 50 is disposed in the accommodation groove S0 through the opening S1, and the ferrule 50 is supported by the supporting portion 420. In detail, each extension portion 410 further defines a guide slot 412 located on the lateral surface 411. The supporting portion 420 further defines a block surface 422 facing the opening S1 of the accommodation groove S0, and the supporting portion 420 includes two pillars 423 protruding from the block surface 422. The ferrule 50 includes two protrusions 510 and defines two fastening holes 520. When the ferrule 50 is disposed in the accommodation groove S0 from the opening S1, each protrusion 510 is slidably disposed in the respective guide slot 412, and each pillar 423 is inserted into the respective fastening hole 520. Thus, the ferrule 50 is securely positioned in the accommodation groove S0, and a horizontal section of the lateral surface 411 in the guide slot 412 supports the protrusion 510. The ferrule 50 further defines a lower surface 530 facing the outer surface 210 of the substrate 20, and there is a gap space G between the lower surface 530 and the outer surface 210. It is worth nothing that the present disclosure is not limited to the numbers of the guide slots 412, the pillars 423, the protrusions 510 and the fastening holes 520.

Figure 6:
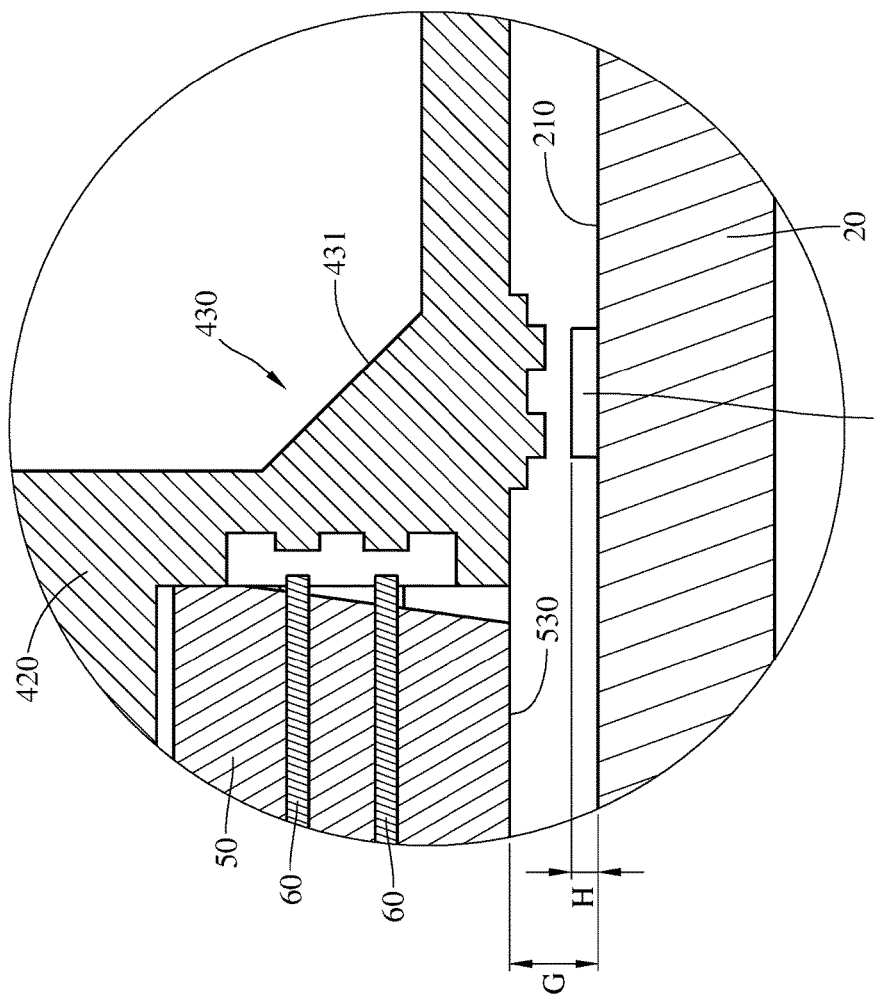
FIG. 6 is an enlarged view of the optical transceiver in FIG. 5.

The optical path in the optical transceiver 1 is shown in FIG. 6. FIG. 6 is an enlarged view of the optical transceiver in FIG. 5. As shown in FIG. 4 through FIG. 6, the ferrule 50 is an MT-type connector ferrule, and the light reflecting surface 431 of the reflecting portion 430 faces the ferrule 50. The ferrule 50 defines multiple optical fiber holes, and there are multiple optical fibers 60 inserted into their corresponding optical fiber holes so as to obtain an optical fiber array.

When light traveling in the optical fiber 60 is incident on the reflecting surface 431, light is reflected by the reflecting surface 431 to change its direction, thereby traveling toward the active component (i.e. P-I-N photodiode) of the transceiver module 30. Also, when light is emitted from the active component (i.e. laser diode), light is reflected by the reflecting surface 431 so as to travel into the optical fiber 60. The gap space G between the lower surface 530 of the ferrule 50 and the outer surface 210 of the substrate 20 is larger than a thickness H of the transceiver module 30.

A conventional housing for a ferrule generally includes a protection layer between the ferrule and an active component of the transceiver module, or between the ferrule and an electronic component thereof. In such case, the optical path is extended by the thickness of the protection layer, thereby reducing the coupling efficiency between the optical fiber and the transceiver module. In this embodiment, the bottom surface 421 of the supporting portion 420, the lateral surfaces 411 of the two extension portions 410 and the outer surface 210 of the substrate 20 jointly form an accommodation groove S0 for disposing the ferrule 50; that is, unlike the conventional housing, the optical lens 40 has no protection layer between the ferrule 50 and the transceiver module 30. Therefore, the optical lens 40 with a thin thickness is obtained so as to optimize the coupling efficiency, thereby gaining higher optical performance.

In this embodiment, the gap space G between the lower surface 530 and the outer surface 210 is larger than the thickness H of the transceiver module 30. Further, as shown in FIG. 6, any portion of the optical lens 40 is not located between the lower surface 530 and the outer surface 210 in this embodiment. More specifically, the space gap G is formed between the optical lens 40 and the outer surface 210 of the substrate 20, and only the transceiver module 30 is disposed in the gap space G. Therefore, a sufficient amount of the gap space G is favorable for accommodating the transceiver module 30 as well as preventing any damage to the transceiver module 30 and the bonding wires at the periphery of the same. In some embodiment, under the premise of sufficient amount of gap space G and no interference with the transceiver module 30, part of the optical lens 40 may be located in the gap space G. In some other embodiments, to optimize space utilization of the gap space G, there may be some additional electronic components disposed in the gap space G.

Moreover, as shown in FIG. 4, in this embodiment, there is a distance S between the extension portion 410 of the optical lens 40 and an edge 212 of the substrate 20. Therefore, it is favorable for providing a region on the outer surface 210 for placing other electronic components and printed circuit.

Furthermore, in this embodiment, both the extension portion 410 and the supporting portion 420 of the optical lens 40 are made of light penetrable material; in some embodiments, the optical lens 40 is made of light penetrable material. Therefore, it is favorable for manufacturing the optical lens 40 in a manufacturing process with few of steps so as to improve the manufacturing yield rate and reduce cost.

According to the present disclosure, the bottom surface of the supporting portion, the lateral surfaces of the two extension portions and the outer surface of the substrate jointly form an accommodation groove, and the ferrule is able to be disposed in the accommodation groove. Therefore, the optical lens with a thinner thickness is obtained so as to optimize the coupling efficiency between the optical fiber and the transceiver module, thereby gaining a higher optical performance.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, comprising:
    a substrate;
    a transceiver module disposed on an outer surface of the substrate;
    an optical lens comprising a supporting portion and at least one extension portion connected to the supporting portion, the at least one extension portion being located between the supporting portion and the substrate, a side of the at least one extension portion opposite to the supporting portion being disposed on the outer surface of the substrate, the supporting portion covering the transceiver module, a bottom surface of the supporting portion facing the outer surface, the bottom surface being spaced apart from the outer surface, a lateral surface of the at least one extension portion being connected to the bottom surface, the bottom surface of the supporting portion, the lateral surface of the at least one extension portion and the outer surface of the substrate jointly defining an accommodation groove; and
    a ferrule disposed in the accommodation groove through an opening of the accommodation groove, the ferrule being supported by the supporting portion,
    wherein the at least one extension portion further defines a guide slot connected to the accommodation groove, the guide slot is located on the lateral surface of the at least one extension portion, and the ferrule comprises a protrusion which is slidably disposed in the guide slot, and
    wherein a lower surface of the ferrule faces the outer surface of the substrate, and there is a gap space between the lower surface and the outer surface of the substrate.

2. The optical transceiver according to claim 1, wherein the gap space is larger than a thickness of the transceiver module.

3. The optical transceiver according to claim 1, wherein any portion of the optical lens is not located between the lower surface and the outer surface of the substrate.

4. The optical transceiver according to claim 1, wherein a number of the at least one extension portion is two, the two extension portions are respectively located on two sides of the supporting portion opposite to each other, the two lateral surfaces face each other, and the transceiver module is located between the two lateral surfaces.

5. The optical transceiver according to claim 1, wherein the optical lens further comprises a reflecting portion disposed on the supporting portion, and a light reflecting surface of the reflecting portion faces the ferrule.

6. The optical transceiver according to claim 1, wherein both the supporting portion and the at least one extension portion are made of light penetrable material.

7. The optical transceiver according to claim 1, wherein a block surface of the supporting portion faces the opening of the accommodation groove, the supporting portion comprises a pillar protruding from the block surface, and the pillar is inserted into a fastening hole of the ferrule.

8. The optical transceiver according to claim 1, wherein there is a distance between the at least one extension portion and an edge of the substrate.

9. An optical transceiver, comprising:
    a substrate; and
    an optical lens comprising a supporting portion and at least one extension portion connected to the supporting portion, the at least one extension portion being located between the supporting portion and the substrate, a side of the at least one extension portion opposite to the supporting portion being disposed on an outer surface of the substrate, a bottom surface of the supporting portion facing the outer surface, the bottom surface being spaced apart from the outer surface, a lateral surface of the at least one extension portion being connected to the bottom surface,
    wherein the bottom surface of the supporting portion, the lateral surface of the at least one extension portion and the outer surface of the substrate jointly define an accommodation groove allowing for placement of a ferrule,
    wherein the at least one extension portion further defines a guide slot connected to the accommodation groove, the guide slot is located on the lateral surface of the at least one extension portion, and the ferrule comprises a protrusion which is slidably disposed in the guide slot, and
    wherein a lower surface of the ferrule faces the outer surface of the substrate, and there is a gap space between the lower surface and the outer surface of the substrate.

* * * * *